No. 685,228. Patented Oct. 22, 1901.
O. W. SIEBERT.
CHILD'S CARRIAGE.
(Application filed Aug. 22, 1901.)
(No Model.)
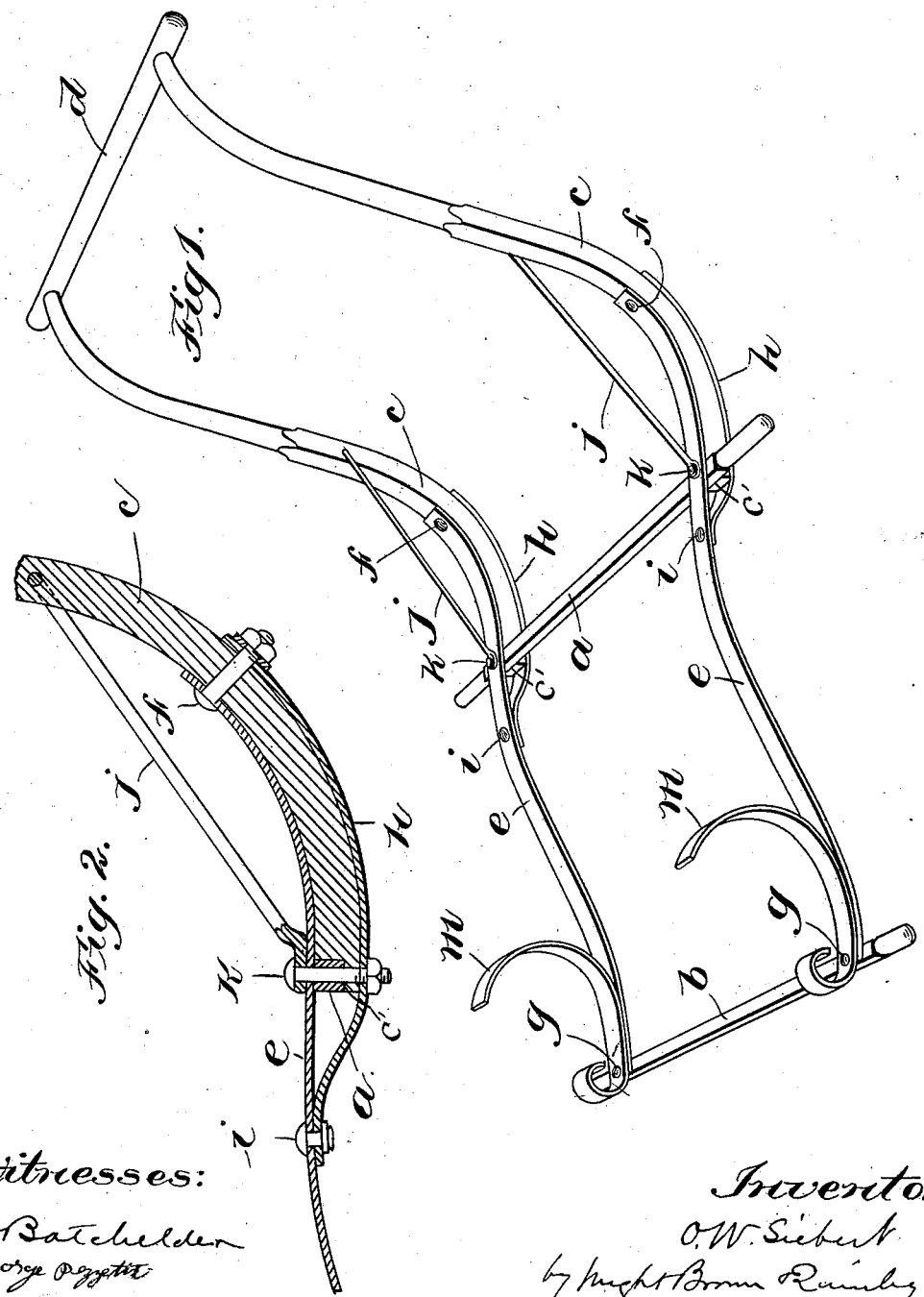
Witnesses:
E. Batchelder
George Pettit
Inventor:
O. W. Siebert
by Wright Brown Quinby
Attys

UNITED STATES PATENT OFFICE.

OTTO W. SIEBERT, OF WEST GARDNER, MASSACHUSETTS, ASSIGNOR TO BAY STATE METAL WHEEL COMPANY, OF EAST TEMPLETON, MASSACHUSETTS, A CORPORATION OF MASSACHUSETTS.

CHILD'S CARRIAGE.

SPECIFICATION forming part of Letters Patent No. 685,228, dated October 22, 1901.

Application filed August 22, 1901. Serial No. 72,873. (No model.)

*To all whom it may concern:*

Be it known that I, OTTO W. SIEBERT, of West Gardner, in the county of Worcester and State of Massachusetts, have invented certain new and useful Improvements in Children's Carriages or Go-Carts, &c., of which the following is a specification.

This invention relates to what is known as a "propelling-gear" of a child's carriage or go-cart, the same comprising the transverse rear handle, the curved bars connecting the rear handle with the rear axle, and a connection between the rear axle and the forward axle.

The invention has for its object to provide a simple, strong, and resilient structure whereby the front and rear axles may be flexibly connected and whereby the handle may be flexibly supported, so that the jar or tremor experienced by the person propelling the vehicle will be reduced to the minimum.

The invention consists in the improvements which I will now proceed to describe and claim.

Of the accompanying drawings, forming a part of this specification, Figure 1 represents a perspective view of a propelling-gear embodying my invention. Fig. 2 represents a sectional view of a portion of the structure shown in Fig. 1.

The same letters of reference indicate the same parts in both figures.

In the drawings, $a$ represents the rear axle, and $b$ the forward axle, of a child's carriage or go-cart.

$c\ c$ represent the curved handle-bars, which are preferably made of wood and have the usual ogee curvature, said handle-bars being recessed at their lower ends to form seats $c'$, bearing on the rear axle $a$.

$d$ represents the handle, which is connected with the upper ends of the handle-bars $c\ c$ in the usual or any suitable way.

$e\ e$ represent resilient reaches, made of strips of spring-steel or other suitable metal. The rear portions of said reaches bear upon the upper portions of the handle-bars $c$ and are secured thereto by bolts $f$. The reaches extend forward from the handle-bars across the rear axle $a$ to the front axle $b$, to which they are secured by bolts $g$.

$h\ h$ represent reinforcing metal strips, which bear upon the under sides of the handle-bars $c\ c$ and extend forward therefrom under the rear axle $a$ and are bent upwardly and bolted or riveted at $i\ i$ to the reaches $e\ e$ at points in front of the rear axle.

$j\ j$ represent inclined braces, which are affixed at their upper ends to the handle-bars and are secured at their lower ends by bolts $k\ k$, which pass through the reaches, the handle-bars, the rear axle, and the reinforcing-strips and clamp the rear axle on the seats $c'$, the construction as a whole forming a rigid connection of the handle-bars with the rear axle, whereby the movements of the carriage may be kept under perfect control by the person propelling the vehicle.

It will be seen that the described construction provides a strong, durable, and efficient propelling-gear whereby the operator may effectively control the vehicle. The resilient reaches connecting the rear and front axles give the handle-bars and the handle such a degree of resiliency as to absorb the jars and vibrations incidental to propelling the carriage over a rough surface, so that the jar upon the hands of the operator is reduced to the minimum. The reinforcing-strips $h$ contribute materially to the strength and durability of the construction and prevent liability of accidental detachment of the parts with which they are connected.

$m\ m$ represent the base portions of the springs, upon which the body of the vehicle is supported, the upper portions of said springs being connected in the usual or any suitable manner with the body.

I claim—

In a child's carriage or go-cart the combination with the front and rear axles of the curved handle-bars having seats at their lower ends bearing on the rear axle their upper ends being connected by a cross-bar or handle, the resilient reaches bearing at their rear portions on the upper sides of the handle-bars and extending therefrom across the rear axle and to the front axle, said reaches being bolted to the handle-bars at their rear ends, to the front axle at their forward ends, and to the rear axle at intermediate points, and the reinforcing-strips bearing on the under sides of the handle-bars and extending across the rear axle, said strips being secured to the handle-bars behind the rear axle and to the reaches in front of the rear axle, whereby a rigid connection of the handle-bars with the rear axle is afforded.

In testimony whereof I have affixed my signature in presence of two witnesses.

OTTO W. SIEBERT.

Witnesses:
GEO. R. WARFIELD,
MYRA E. WARFIELD.